(12) United States Patent
Honda et al.

(10) Patent No.: US 8,170,542 B2
(45) Date of Patent: May 1, 2012

(54) MOBILE COMMUNICATION SYSTEM FOR NOTIFYING SUBSCRIBER IDENTITY IDENTITY CODE NOTIFICATION APPARATUS

(75) Inventors: Yasuyuki Honda, Yokohama (JP); Taro Ogawa, Nerima-ku (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 271 days.

(21) Appl. No.: 12/409,771

(22) Filed: Mar. 24, 2009

(65) Prior Publication Data

US 2009/0247128 A1 Oct. 1, 2009

(30) Foreign Application Priority Data

Mar. 25, 2008 (JP) ................................. 2008-078566

(51) Int. Cl.
*H04W 4/00* (2009.01)
(52) U.S. Cl. .................. 455/422.1; 455/411; 455/435.1; 455/435.2; 370/312; 370/230
(58) Field of Classification Search .................. 455/410, 455/414.2, 415, 419–421, 432.3, 422.1, 433, 455/435.1–435.3
See application file for complete search history.

(56) References Cited

U.S. PATENT DOCUMENTS

| 2006/0034215 A1* | 2/2006 | Moon et al. ..................... 370/328 |
| 2007/0281694 A1* | 12/2007 | Lin et al. ..................... 455/435.2 |
| 2009/0303909 A1* | 12/2009 | Farhoudi et al. .............. 370/312 |

FOREIGN PATENT DOCUMENTS

| CN | 1320346 A | 10/2001 |
| DE | 10 2005 024 011 A1 | 11/2006 |
| EP | 1 727 383 A1 | 11/2006 |
| JP | 10-290294 | 10/1998 |
| JP | 2002-152793 A | 5/2002 |
| JP | 2002-305580 A | 10/2002 |
| JP | 2006-121335 A | 5/2006 |
| JP | 2007-251332 | 9/2007 |
| WO | WO 96/21326 | 7/1996 |
| WO | WO 00/21306 A2 | 4/2000 |
| WO | WO2005081569 A1 * | 9/2005 |
| WO | WO 2006/122588 A1 | 11/2006 |
| WO | WO 2007/030355 A1 | 3/2007 |
| WO | WO 2007/133139 A1 | 11/2007 |

OTHER PUBLICATIONS

Chinese Office Action w/Translation, dated Oct. 26, 2011, 15 pages.

\* cited by examiner

*Primary Examiner* — Kent Chang
*Assistant Examiner* — Keith Fang
(74) *Attorney, Agent, or Firm* — Crowell & Moring LLP (57) ABSTRACT

A mobile communication system is provided such that multiple identity codes assigned to a terminal device are displayed on the terminal device, whereby such multiple identity codes are selectively and arbitrarily used without a specific provision, and an identity code is displayed according to an arrival of an appropriate notification chance. A subscriber identity code notification apparatus is also provided. A subscriber identity code holding device holds multiple identity codes such as telephone numbers, which are applicable to a single terminal device and which are different depending on the telecommunications carrier. A subscriber identity code notification apparatus is provide such that the subscriber identity code held by the subscriber identity code holding device notifies the terminal device of the corresponding subscriber identity code, in discrimination of an arrival of a given notification chance.

10 Claims, 5 Drawing Sheets

MOBILE COMMUNICATION SYSTEM FOR NOTIFYING SUBSCRIBER IDENTITY IDENTITY CODE NOTIFICATION APPARATUS

BACKGROUND OF THE INVENTION

1. Field of the Invention

The present invention relates to a mobile communication system, which allows multiple subscriber identity codes to a single terminal device to represent the single terminal device, the multiple subscriber identity codes including a (first) subscriber identity code such as a telephone number corresponding to a (first) telecommunications carrier providing a primary contract and another (second) subscriber identity code corresponding to another (second) telecommunications carrier. The present invention also relates to a subscriber identity code notification apparatus applied to the mobile communication system.

2. Description of the Related Art

There has been a widely used service whereby multiple telephone numbers are assigned to a single mobile information terminal device such as a mobile telephone, so that its subscriber is able to selectively use the telephone numbers depending on his or her intended use.

In such a service, generally, not only a telephone number assigned to the terminal device according to the primary contract with a telecommunications carrier but also another telephone number are assigned by the same telecommunications carrier according to the accessorial service in relation to the primary contract. This allows a user to selectively use the telephone numbers in an appropriate manner.

In recent years, however, another type of service has already started such that different telecommunications carries assign multiple telephone numbers to a terminal device that functions for a single line at the same time.

In such a case, since considerations are made so that a user (subscriber) is able to continuously use the existing terminal device (mobile telephone) as before, the user is able to use the service without the need of buying a dedicated terminal device It is to be noted that when the existing terminal device is used, subscriber identity information stored in a Subscriber Identity Module (SIM) card applied to the terminal device, namely only a single subscriber identity code (telephone number) can be displayed on an indicator, in response to a specific key operation on the terminal device.

This is because a circuit in the existing terminal device is configured to display only a single subscriber identity code, namely telephone number. Even if multiple subscriber identity codes are made to store in a SIM card, it is impossible to display multiple subscriber identity codes as far as the above circuit configuration is employed.

In connection with the service that makes multiple subscriber identity codes available on a single terminal device, there are several proposals.

JP H10-290294 A (hereinafter, referred to Patent Document 1) proposes a technique of allowing a user to use multiple telephone numbers, without the necessity of holding multiple telephone numbers in a mobile telephone.

Patent Document 1 discloses that an audio guidance is given for prompting a user to input the period of service, charged destination information, registration number, and secondary subscriber number, via a mobile switching center. In response to the guidance, information that has been input by the user beforehand is registered. In addition to the original subscriber number, another subscriber number is temporarily made available on an identical terminal device.

JP 2002-152793 A (hereinafter, referred to Patent Document 2) proposes a technique of permanently assigning multiple telephone numbers to a single terminal device without the need for registration of numbers on the terminal device.

Patent Document 2 discloses that an incoming or outgoing call is generated on the terminal device with a communication function for a single system and multiple subscriber numbers A and B for use in a single system. A base transceiver station establishes communication with the terminal device via a radio interface for a single system. A mobile communication system manages the incoming or outgoing call generated by the terminal device. If multiple subscriber numbers A and B are to be changed depending on the intended use or purpose, the mobile communication system is allowed to change between the multiple subscriber numbers depending on the intended use or purpose.

JP 2006-121335 A (hereinafter, referred to Patent Document 3) proposes that in a case where a terminal device for utilizing telephone communication based upon each of multiple telephone numbers, the terminal device is configured so that when a user receives an incoming call, the user is able to confirm which telephone number has received the incoming call.

Patent Document 3 discloses that multiple telephone numbers are read out of a Universal Subscriber Identity Module (USIM) by means of the controller of the terminal device. The radio communication section is controlled to send the telephone number to the communication management system on a mobile telephone communication network so as to authenticate each telephone number for communication. Then, upon receipt of an incoming call for the telephone number that has been authenticated, the controller controls the speaker or display section to output the information that specifies the telephone number together with the notification of the incoming call.

JP 2002-305580 A (hereinafter, referred to Patent Document 4) proposes the purpose of automatically updating the telephone directory data retained by the receiving-side terminal device that has received the notification that the telephone number has been changed. Then, the transmitting-side terminal device is notified of the update.

According to the technique disclosed in Patent Document 4, the above notification is made by a character message or the like. Therefore, the telephone number that has been assigned to the above transmitting-side terminal device can be checked with eyes on the transmitting-side terminal device that has transmitted the changed telephone number.

In any one of the proposed techniques, multiple identity codes cannot be displayed on the terminal device without performing a process for adding a specific circuit to the terminal device.

Accordingly, the subscriber (user) of the terminal device has to record an identity code separately beforehand in a note or the like at the time of learning the identity code, such as at the time of a contract or registration, in order to tell a third party a part or the entire of multiple identity codes registered to be available.

It should be appreciated that even if multiple identity codes are registered to be selectively available according to the situation as described above, such a cumbersome procedure for daily use is not eliminated. This will remain a concern for insufficient utilization.

Besides, when a specific switch or the like for displaying multiple identity codes on the terminal device is not provided, or when a specific operation is not required even for an existing key as a precondition, an appropriate procedure is needed for displaying the identity codes based upon what action should be a trigger.

It is to be understood that any one of the above Patent Documents lacks a viewpoint of the trigger for displaying the identity codes. It is also to be understood that that suitable measures are not suggested.

SUMMARY OF THE INVENTION

The present invention has been made in the above circumstances and provides a mobile communication system whereby multiple identity codes assigned to a single terminal device are displayed on the single terminal device on which multiple identity codes are arbitrarily selected by a subscriber, without the provision of a specific configuration. The present invention also provides a mobile communication system that allows the identity code at an arrival of an appropriate timing and a subscriber identity code notification apparatus.

According to an aspect of the present invention, there is provided a mobile communication system including: a terminal device to which multiple subscriber identity codes are allowed to be assigned to represent the terminal device, the multiple subscriber identity codes including a first subscriber identity code corresponding to a first telecommunications carrier providing a primary contract with the terminal device and a second subscriber identity code corresponding to a second telecommunications carrier; a subscriber identity code holding device that holds the multiple subscriber identity codes; and a subscriber identity code notification apparatus that discriminates an arrival of a given notification chance to notify the terminal device of at least one of the multiple subscriber identity codes held by the subscriber identity code holding device.

With such a configuration, multiple subscriber identity codes (for example, telephone numbers) are allowed to be assigned a single terminal device (for example, mobile telephone) to represent the terminal device, the multiple subscriber identity codes including a first subscriber identity code corresponding to a first telecommunications carrier providing a primary contract with the terminal device and a second subscriber identity code corresponding to a second telecommunications carrier.

In such a mobile communication system, there is provided a subscriber identity code holding device in which multiple subscriber identity codes are held.

In the above mobile communication system, a subscriber identity code may be at least one of a telephone number and an e-mail address.

In such a communication system, at least one of a telephone number and an e-mail address may be applied as the above multiple subscriber identity codes.

According to another aspect of the present invention, there is provided a subscriber identity code notification apparatus applied to a mobile communication system having a terminal device to which multiple subscriber identity codes are allowed to be assigned to represent the terminal device, the multiple subscriber identity codes including a first subscriber identity code corresponding to a first telecommunications carrier providing a primary contract with the terminal device and a second subscriber identity code corresponding to a second telecommunications carrier, the subscriber identity code notification apparatus including: a notification chance discrimination section that discriminates an arrival of a given notification chance; and a subscriber identity code notification section that notifies the terminal device of at least one of the multiple subscriber identity codes, when the notification chance discrimination section discriminates the arrival of the given notification chance.

The above subscriber identity code notification apparatus is applied to a mobile communication system having a terminal device to which multiple subscriber identity codes are allowed to be assigned to represent the terminal device, the multiple subscriber identity codes including a first subscriber identity code corresponding to a first telecommunications carrier providing a primary contract with the terminal device and a second subscriber identity code corresponding to a second telecommunications carrier.

The above subscriber identity code notification apparatus may include a notification chance discrimination section that discriminates an arrival of a given notification chance.

The above subscriber identity code notification apparatus may further include a subscriber identity code notification section that notifies the terminal device of at least one of the multiple subscriber identity codes, when the notification chance discrimination section discriminates the arrival of the given notification chance.

In the above subscriber identity code notification apparatus, the notification chance discrimination section may recognize the arrival of the notification chance of notifying the second subscriber identity code, when the mobile device is detected to reside in a second network managed by the second telecommunications carrier at the time of a location registration of the mobile device.

With such a configuration, the notification chance discrimination section may recognize the arrival of the notification chance of notifying the second subscriber identity code, when the mobile device is detected to reside in a second network managed by the second telecommunications carrier at the time of location registration of the mobile device.

In the above subscriber identity code notification apparatus, the notification chance discrimination section may recognize the arrival of the notification chance of notifying the second subscriber identity code, when the mobile device is detected to reside in a network managed by the second telecommunications carrier at the time of a location registration of the mobile device, and after the subscriber identity code notification section notifies of the second subscriber identity code in accordance with the discrimination, another discrimination of the arrival of the notification chance may be suppressed until the terminal device is detected to have returned to a first network managed by the first telecommunications carrier.

With such a configuration, the notification chance discrimination section discriminates the arrival of the notification chance of notifying the second subscriber identity code, when the mobile device is detected to reside in a network managed by the second telecommunications carrier at the time of a location registration of the mobile device.

After the subscriber identity code notification section notifies of the second subscriber identity code in accordance with the discrimination, another discrimination of the arrival of the notification chance is suppressed until the terminal device is detected to have returned to a first network managed by the first telecommunications carrier.

In the above subscriber identity code notification apparatus, the notification chance discrimination section may recognize the arrival of the notification chance of notifying the second subscriber identity code, when the mobile device is detected to reside in a network managed by the second telecommunications carrier at the time of a location registration of the mobile device, and after the subscriber identity code notification section notifies of the second subscriber identity code in accordance with the discrimination or confirms that the notification is completed by repeatedly notifying the second subscriber identity code, another discrimination of the arrival of the notification chance may be suppressed until the terminal device is detected to have returned to a first network managed by the first telecommunications carrier.

With such a configuration, the notification chance discrimination section discriminates the arrival of the notification chance of notifying the second subscriber identity code, when the mobile device is detected to reside in a network managed by the second telecommunications carrier at the time of a location registration of the mobile device.

After the subscriber identity code notification section notifies of the second subscriber identity code in accordance with the discrimination or confirms that the notification is completed by repeatedly notifying the second subscriber identity code, another discrimination of the arrival of the notification chance is suppressed until the terminal device is detected to have returned to a first network managed by the first telecommunications carrier.

In the above subscriber identity code notification apparatus, the subscriber identity code notification section may originate an incoming call to the terminal device with the second subscriber identity code corresponding to the second telecommunications carrier used as a subscriber identity code of a source of the incoming call, in response to the discrimination of the arrival of the notification chance of the second subscriber identity code corresponding to the second telecommunications carrier when the notification chance discrimination section performs a location registration of the terminal device.

With such a configuration, the subscriber identity code notification section originates an incoming call to the terminal device with the second subscriber identity code corresponding to the second telecommunications carrier used as a subscriber identity code of a source of the incoming call, in response to the discrimination of the arrival of the notification chance of the second subscriber identity code corresponding to the second telecommunications carrier when the notification chance discrimination section performs a location registration of the terminal device.

This allows a subscriber to use an incoming call recording function on the terminal device of this type, thereby recognizing the identity number assigned to the terminal device as a subscriber identity code of a source of the call from the incoming call record.

In the above subscriber identity code notification apparatus, the subscriber identity code notification section may include: a discrimination formation detecting section that detects a formation of the discrimination by the notification chance discrimination section; and a transmitter that transmits said at least one of the multiple subscriber identity codes to the terminal device by means of any one of an e-mail, a Sort Message Service, and Multimedia Messaging Service, in response to the formation of the discrimination at the discrimination formation detecting section.

With such a configuration, the subscriber identity code notification apparatus includes a discrimination formation detecting section and a transmitter.

In the discrimination formation detecting section, the formation of the discrimination is detected at the notification chance discrimination section.

In addition, a transmitter transmits the above at least one of the multiple subscriber identity codes to the terminal device by means of any one of an e-mail, a Sort Message Service, and Multimedia Messaging Service, in response to the formation of the discrimination at the discrimination formation detecting section.

In the above subscriber identity code notification apparatus, a subscriber identity code may be at least one of a telephone number and an e-mail address.

With such a configuration, at least one of a telephone number and an e-mail address is applied to the subscriber identity code.

According to an aspect of the present invention, multiple identity codes assigned to a terminal device are displayed on the terminal device, whereby such multiple identity codes are selectively and arbitrarily used without a specific provision. According to another aspect of the present invention, there is provided a mobile communication system by which an identity code is displayed according to an arrival of an appropriate notification chance. According to yet another aspect of the present invention, there is provided a subscriber identity code notification apparatus.

DETAILED DESCRIPTION OF THE PREFERRED EMBODIMENTS

The embodiments of the present invention will now be described with reference to the drawings. In each of the drawings to be referred to in the following description, substantial parts that are main subjects of the description will be highlighted as necessary, whereas other parts will be simplified or omitted as necessary.

(Overview of Group Communication System)

Figure 1:
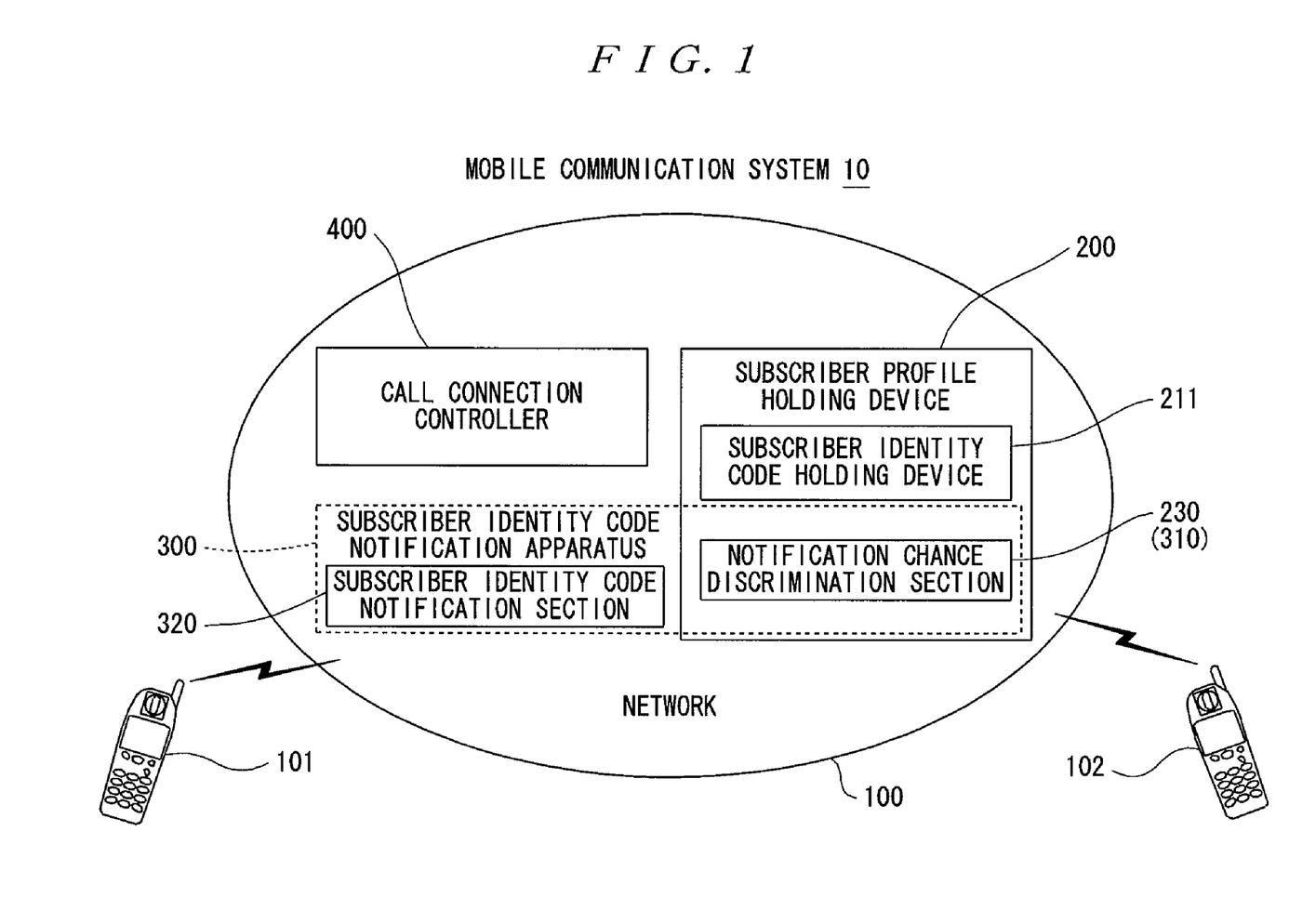
FIG. 1 is a schematic view illustrating a mobile communication system according to an aspect of the present invention.

FIG. 1 is a schematic view illustrating a mobile communication system according to an aspect of the present invention.

In FIG. 1, a mobile communication system 10 is configured as a network including: a subscriber profile holding device 200 provided with a subscriber identity code holding device 211; and a subscriber identity code notification apparatus 300 provided with a subscriber identity code notification section 320. According to the present embodiment, a call connection controller 400 is installed in the network.

The mobile communication system 10 controls call setting and call release between multiple terminal devices (for example, mobile telephones) 101 and 102, which are accommodated in the network or located outside the network. The mobile communication system 10 also performs the following characteristic functions.

Specifically, in the mobile communication system 10, multiple subscriber identity codes are allowed to be assigned to represent a single terminal device (for example, mobile telephone) 101 or 102. Multiple subscriber identity codes include: a (first) subscriber identity code (for example, telephone number) for a (first) telecommunications carrier based upon the primary contract assigned to a single terminal device (for example, mobile telephone) 101 or 102; and another (second) subscriber identity code for another (second) telecommunications carrier.

In the mobile communication system 10 according to an aspect of the present invention, the subscriber identity code holding device 211 is installed in the subscriber profile holding device 200 that composes communication facilities substantially corresponding to a Hone Location Register (HLR) in an existing system. Multiple subscriber identity codes (telephone numbers or mail addresses) are held in the subscriber identity code holding device 211.

The subscriber identity code notification apparatus 300 (or the subscriber identity code notification section 320) discriminates an arrival of a given notification chance, to be described later, and then notifies a single terminal device 101 or 102 of the corresponding subscriber identity code held in the subscriber identity code holding device 211.

Figure 2:
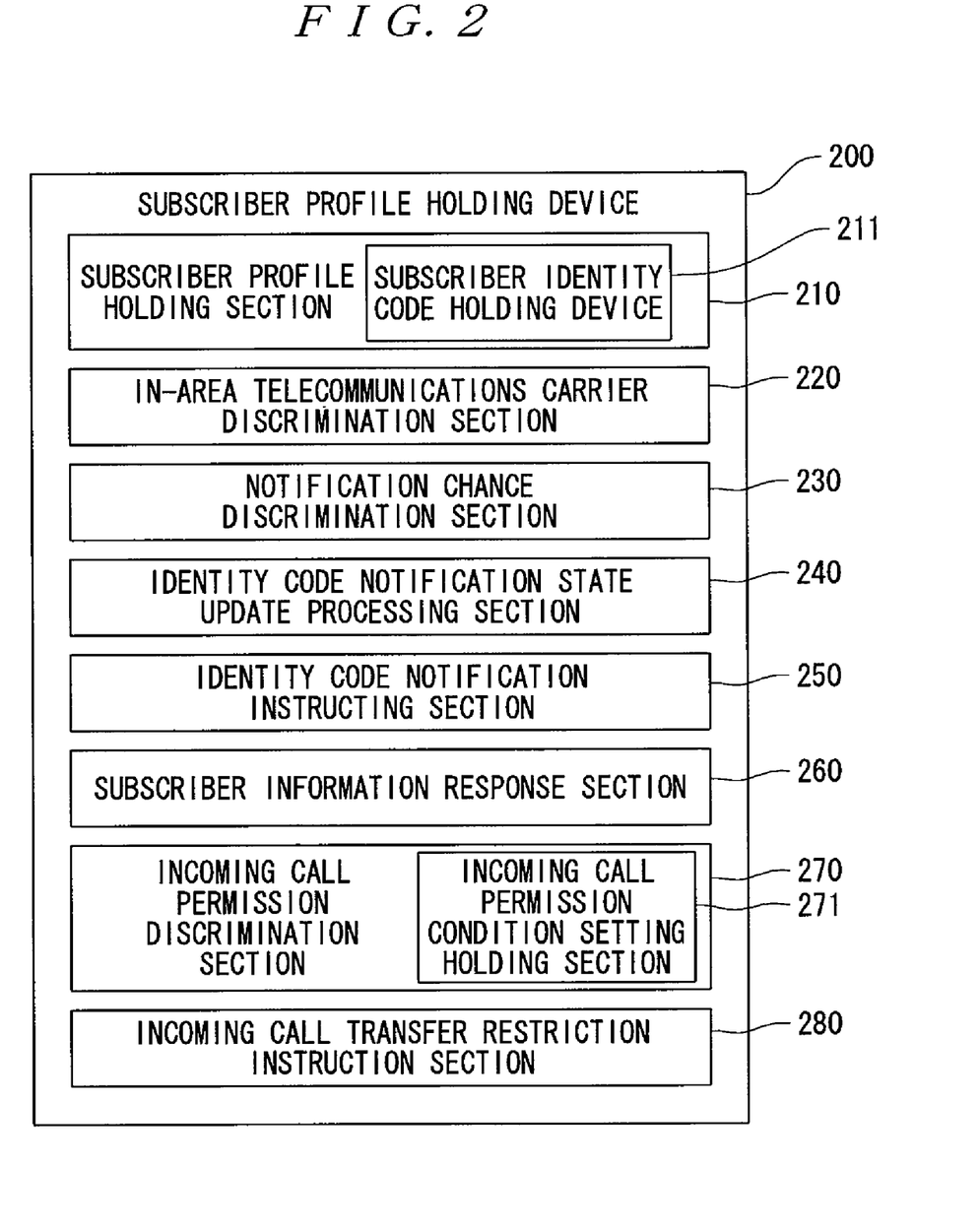
FIG. 2 is a schematic view illustrating a configuration of a subscriber profile holding device in the mobile communication system of FIG. 1.

FIG. 2 is a schematic view illustrating a configuration of the subscriber profile holding device 200 in which the subscriber identity code holding device 211 that serves as a component according to an aspect of the present invention is installed.

The subscriber profile holding device 200 includes: a subscriber profile holding section 210; an in-area telecommunications carrier discrimination section 220; a notification chance discrimination section 230; an identity code notification state update processing section 240; an identity code notification instructing section 250; a subscriber information response section 260; an incoming call permission discrimination section 270; and an incoming call transfer restriction instruction section 280.

The subscriber identity code holding device 211 that serves as a component according to an aspect of the present invention is installed in the subscriber profile holding section 210.

The subscriber profile holding section 210 holds the subscriber identity code, such as a telephone number or e-mail address, held by the subscriber identity code holding device 211 in such a manner that multiple subscriber identity codes are allowed to be assigned to a single subscriber's single terminal device. The subscriber profile holding section 210 also holds given subscriber information relating to a service contract.

The in-area telecommunications carrier discrimination section 220 discriminates a telecommunications carrier that manages facilities that cover an area in which the terminal device is included. Examples of the facilities may be a base station apparatus and upper nodes thereof.

The notification chance discrimination section 230 is a functional section that serves as an element of the subscriber identity code notification apparatus 300, as will be described later, and discriminates an arrival of a given notification chance relating to the identity code of the corresponding terminal device.

The identity code notification state update processing section 240 monitors over time the notification state where the identity code corresponding to the terminal device is notified, maintaining a suitable time interval, so that the identity code may be notified repeatedly. After the identity code is notified once, the identity code notification state update processing section 240 controls the discrimination of an arrival of the notification chance until the return of the corresponding terminal device to the inside of the area of the network managed by the telecommunications carrier of the primary contract. For example, when the return to the inside of the area is detected, the history of the notification completion is updated.

The identity code notification instructing section 250 gives an instruction to notify the identity code, when it is discriminated that the state where the condition for notifying the corresponding terminal device of the identity code is satisfied.

The subscriber information response section 260 provides the subscriber information, in response to the reference to the subscriber information from the exterior.

The incoming call permission discrimination section 270 discriminates whether or not the incoming call is permitted according to the service contract. This discrimination is performed according to an incoming call permitting condition registered and held in an incoming call permission condition setting holding section 271 of the incoming call permission discrimination section 270.

The incoming call transfer restriction instruction section 280 discriminates whether or not the transfer is permitted based upon the service contract.

Figure 3:
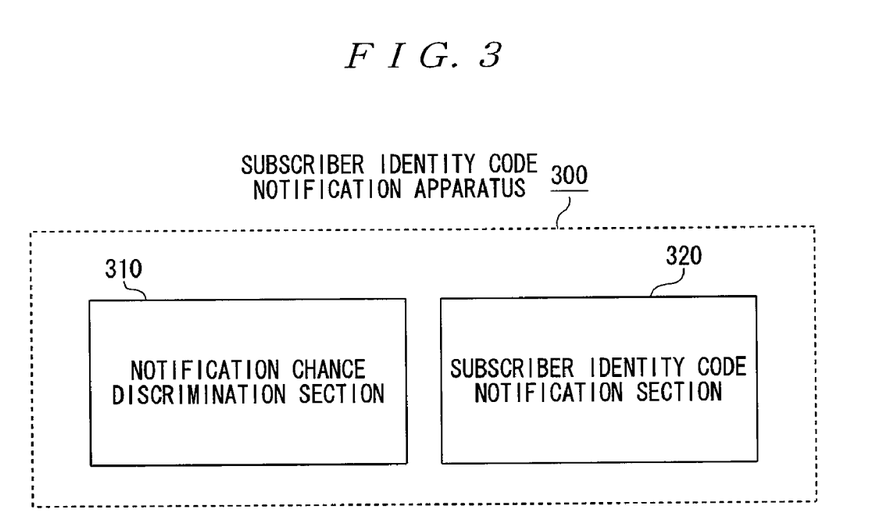
FIG. 3 is a schematic view illustrating a configuration of a subscriber identity code notification apparatus in the mobile communication system of FIG. 1.

FIG. 3 is a schematic view illustrating a configuration of the subscriber identity code notification apparatus 300. The subscriber identity code notification apparatus 300 includes: a notification chance discrimination section 310; and a subscriber identity code notification section 320. According to an aspect of the present invention, both the notification chance discrimination section 310 and the subscriber identity code notification section 320 are partially installed in the subscriber profile holding device 200 and partially set up in the exterior of the subscriber profile holding device 200.

More specifically, the notification chance discrimination section 310 is installed in the notification chance discrimination section 230 of the subscriber profile holding device 200, and discriminates an arrival of a given notification chance, to be described later, and then notifies the subscriber identity code notification section 320 of the arrival.

Meanwhile, the subscriber identity code notification section 320 is set up in the exterior of the subscriber profile holding device 200, and notifies the corresponding terminal device of the corresponding subscriber identity code, when the notification chance discrimination section 310 described above discriminates the arrival of the notification chance.

Figure 4:
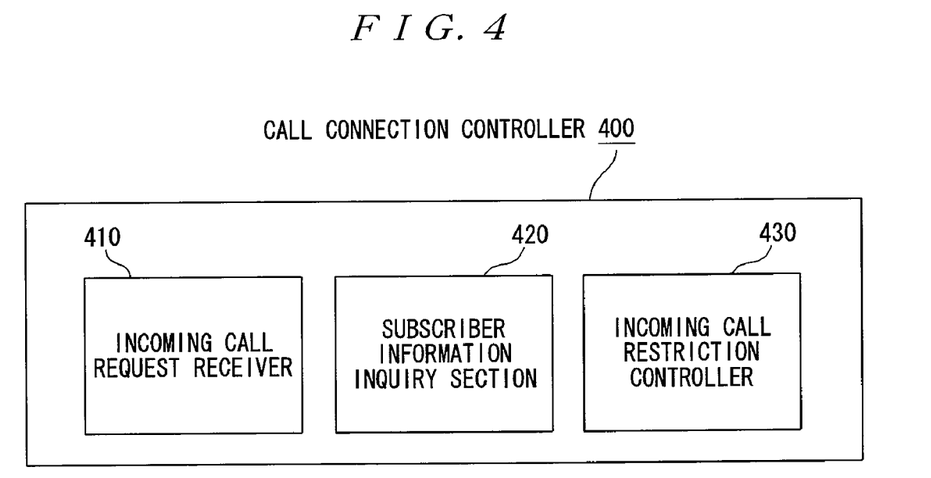
FIG. 4 is a schematic view illustrating a configuration of a call processing device in the mobile communication system of FIG. 1.

FIG. 4 is a schematic view illustrating a configuration of a call connection controller 400. The call connection controller 400 includes: an incoming call request receiver 410; a subscriber information inquiry section 420; and an incoming call restriction controller 430.

The incoming call request receiver 410 receives an incoming call request from the exterior. Also, the subscriber information inquiry section 420 makes an inquiry to the subscriber profile holding device 200 about the subscriber information relating to the incoming call request that has been received by the incoming call request receiver 410.

The incoming call restriction controller 430 discriminates permission or prohibition for the incoming call relating to the incoming call request that has been received by the incoming call request receiver 410 based upon a given incoming call restriction, according to the result of the inquiry obtained by the subscriber information inquiry section 420 from the subscriber profile holding device 200. Then, the incoming call restriction controller 430 controls the restriction of the incoming call or the establishment of the line connection in response to the incoming call request, according to the discrimination.

Figure 5:
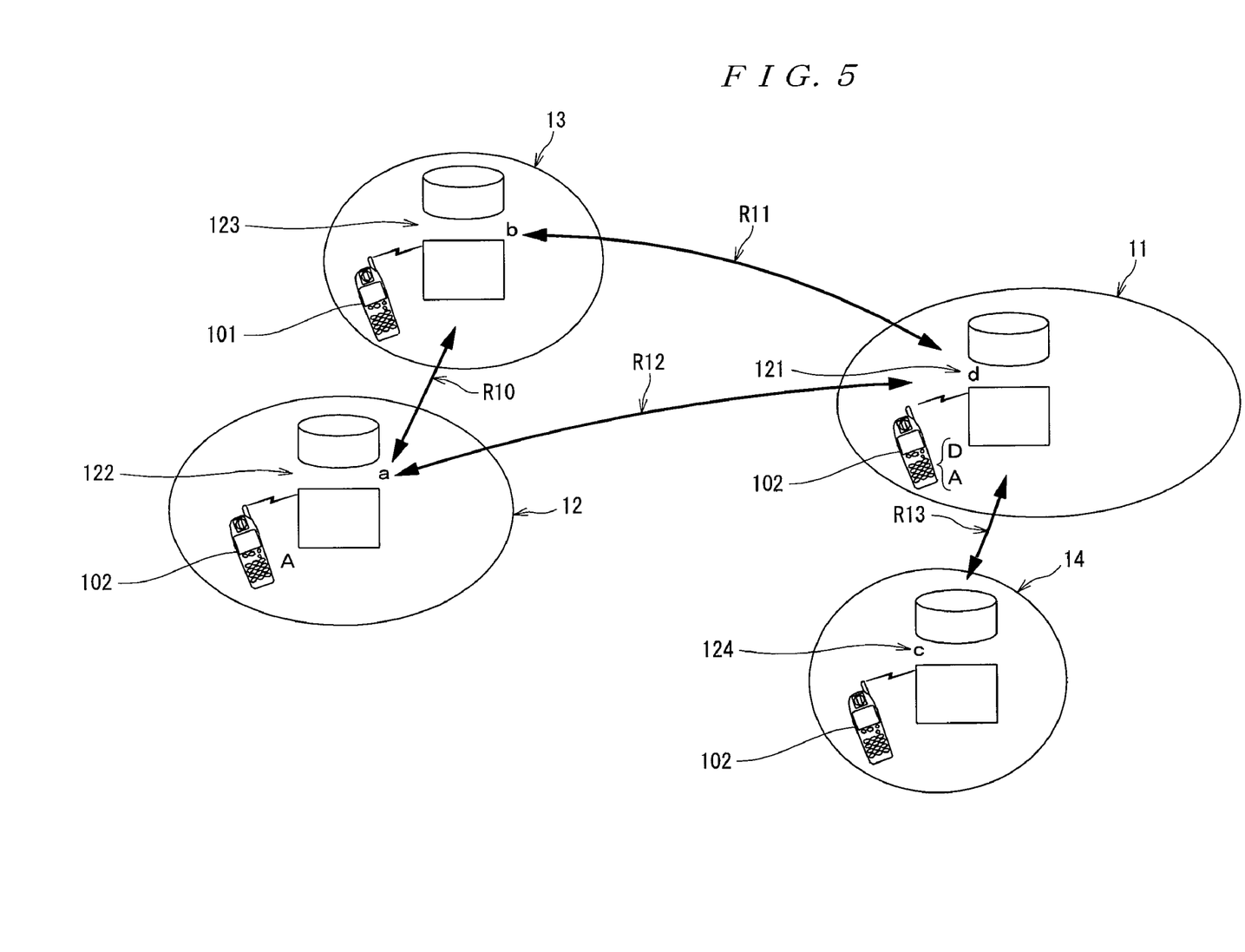
FIG. 5 is a view illustrating in-area states of terminal devices and an occurrence of a notification chance of an identity code to a corresponding terminal device.

FIG. 5 is a view illustrating in-area states of terminal devices and an occurrence of a notification chance of an identity code to a corresponding terminal device.

In FIG. 5, a circle in the upper right conceptually illustrates a network of a telecommunications carrier "d" providing the primary contract with a subscriber (subscriber's terminal device). In the following description, a network 11 of the telecommunications carrier providing such a primary contract will be simply referred to as network 11, in an appropriate manner.

An identity code "D" is assigned to the terminal device 102, as a number, for the primary contract, issued by the telecommunications carrier "d" of the network 11. At the same time, an identity number "A" is assigned, as an accessorial contract number issued by another, for example, an overseas telecommunications carrier "a".

The network 12 managed by the above another telecommunications carrier "a" (hereinafter, referred to as local telecommunications carrier in the following description), which issues the identity code "A" is conceptually represented as a circle in the lower left in FIG. 5.

In addition, a circle in the upper left in FIG. 5 illustrates a network 13, of a yet another telecommunications carrier "b", in which a terminal device 101 that resides and originates a call (hereinafter, simply referred to as originating network).

Furthermore, a circle in the lower right in FIG. 5 illustrates a network 14, of a further another telecommunications carrier "c", to which the terminal device 102 is going to move and reside therein.

The network 11 is provided with mobile communication facilities 121 including a mobile switching center, an HLR, and communication equipment for a radio system, so as to cover the mobile communication services. Since each network is provided with similar facilities to the ordinary network, the drawing is symbolically notated as illustrated.

Likewise, the network 12 of the local telecommunications carrier is provided with mobile communication facilities 122, the network 13 is provided with mobile communication facilities 123, and the network 14 is provided with mobile communication facilities 124, respectively, so as to supply mobile communication services.

Figure 6:
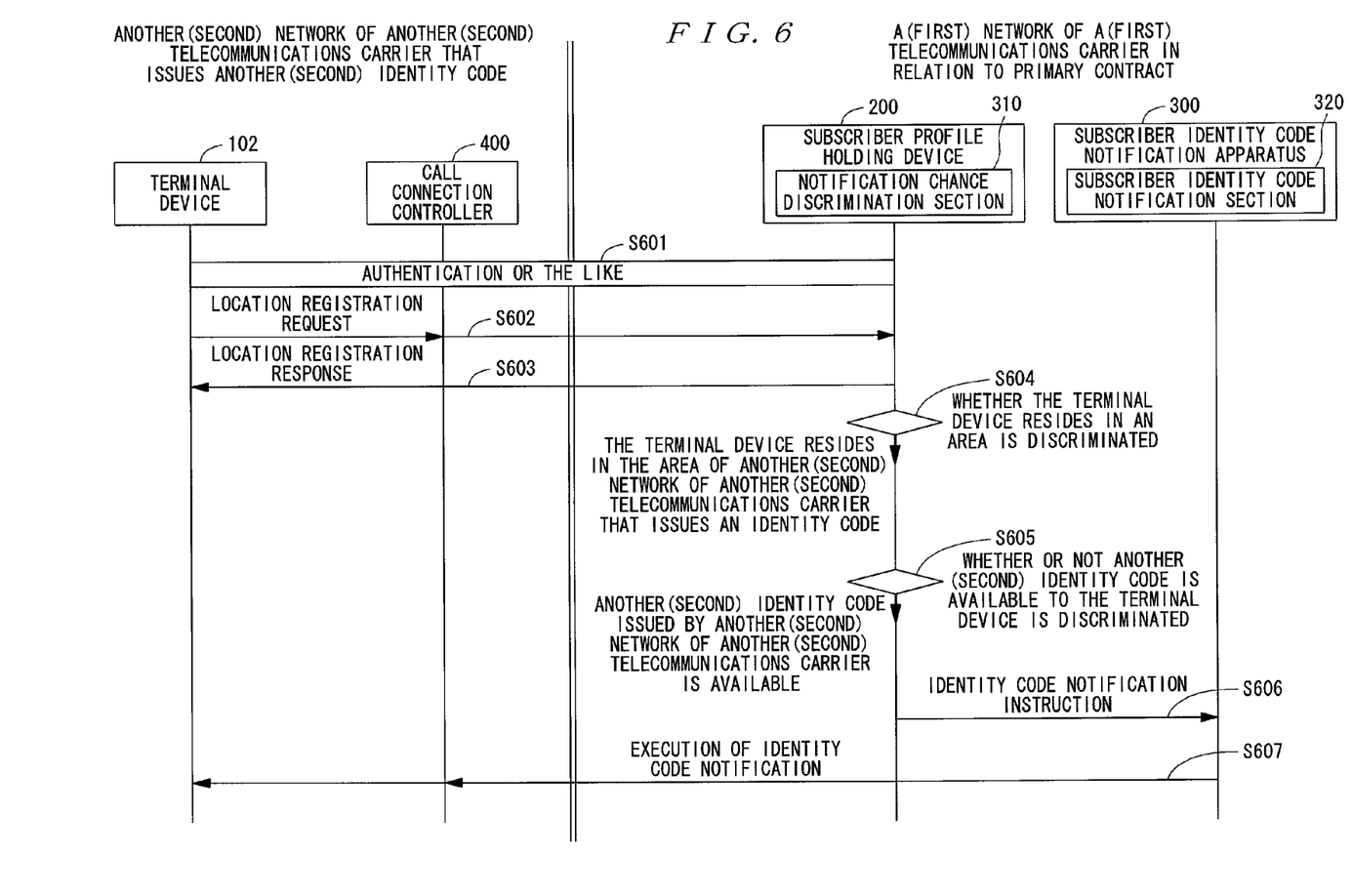
FIG. 6 is a sequence chart for describing an identity code notification operation according to an aspect of the present invention.

FIG. 6 is a sequence chart for describing an identity code notification operation according to an aspect of the present invention.

In FIG. 6, "another (second) network of another (second) telecommunications carrier that issues another (second) identity code" denotes, for example, the network 12 of FIG. 5. The network 12 is managed by the telecommunications carrier "a" having the identity code "A", when the terminal device 102 resides in the network 12 of the telecommunications carrier "a", which is different from the telecommunications carrier "d" making a primary contract with the subscriber (the subscriber's terminal device 102).

In contrast, "a (first) network of a (first) telecommunications carrier in relation to a primary contract" denotes, as the name implies, a network governed by the telecommunication carrier "d" providing a primary contract, namely the network 11 of FIG. 5.

Firstly, an authentication process is performed between the terminal device 102 and the subscriber profile holding device 200 (step S601).

When the authentication process is completed at step S601, a location registration request is then issued to the subscriber profile holding device 200 by the terminal device 102 via the call connection controller 400 (step S602).

In response to the location registration request at step S602, a location registration is completed at the subscriber profile holding device 200. Then, a location registration response is given to the terminal device 102 from the subscriber profile holding device 200 (step S603).

After the execution of step S603, the in-area state is discriminated at the subscriber profile holding device 200 (step S604).

At step S604, it is discriminated that the terminal device 102 resides in the network 12 of the telecommunications carrier "a", which is different from the telecommunications carrier "d" related to the primary contract. Then, the subscriber profile holding device 200 discriminates whether or not the identity code (for example, telephone number), issued by the telecommunications carrier "a" of the network 12 where the terminal device 102 currently resides, is available and whether or not the identity code should be notified to the subscriber, namely the terminal device 102 (step S605).

The discrimination at step S605 discriminates the notification chance at the notification chance discrimination section 310 (230) that has been described with reference to FIG. 1, FIG. 2, and FIG. 3 with regard to the subscriber profile holding device 200.

At step S605, when it is discriminated that the identity code issued by the telecommunications carrier "a" is available and this should be notified to the subscriber (the terminal device 102), an identity code notifying instruction is issued to notify the available identity code to (the subscriber identity code notification section 320 of) the subscriber identity code notification apparatus 300 from (the notification chance discrimination section 310 of) the subscriber profile holding device 200 (step S606).

In response to the identity code notifying instruction at step S606, (the subscriber identity code notification section 320 of) the subscriber identity code notification apparatus 300 notifies the terminal device 102 of the available identity code (step S607).

As described heretofore, by performing the processes of step S601 to step S607 as a whole, the notification chance discrimination section 310 acknowledges an arrival of a chance to notify the terminal device 102 (the subscriber of the terminal device 102) of the subscriber identity code "A" corresponding to the above another telecommunications carrier "a", when it is detected that the terminal device 102 resides in the area of the network 12 managed by the above another telecommunications carrier (local telecommunications carrier) in relation to the location registration of the terminal device 102.

In this case, as described above, with regard to the identity code notification state update processing section 240 of FIG. 2, the identity code notification state update processing section 240 monitors over time the state of notifying the corresponding terminal device of the identity code, and repeatedly notifies the identity code while maintaining a suitable time interval.

In other words, after the identity code is notified once, the discrimination of the arrival of the notification chance is suppressed until the terminal device is detected to have returned to the area in the network managed by the telecommunications carrier "d" providing the primary contract. For example, the history of the notification completion is updated when the return to the area is detected.

By configuring as described above, excessively repeated notification of the identity code is suppressed. The identity code is notified at a suitable time interval, so the identity code is notified in accordance with the subscriber's desire in a sufficient manner.

On the other hand, the identity code is notified by the subscriber identity code notification section 320 of the subscriber identity code notification apparatus 300 that has been described with reference to FIG. 3. In addition, the identity code may be notified in the following way.

To put in other words, in the subscriber identity code notification apparatus 300, at the time of location registration of the terminal device on the notification chance discrimination section 310, the subscriber identity code notification section 320 detects that the terminal device resides in the network 12 managed by the above another telecommunications carrier "a". In response to the discrimination of an arrival of the notification chance of notifying the subscriber identity code "A" corresponding to the above another telecommunications carrier "a", an incoming call arrives at the terminal device 102, with the subscriber identity code "A" corresponding to the above another telecommunications carrier "a" used as a subscriber identity code of the source of the incoming call.

Making use of an incoming call recording function on the terminal device 102 of a general type, the subscriber is able to confirm the identity code "A" that has been assigned to the terminal device as the subscriber identity code of the source of the incoming call, as described above. In addition, it is possible to keep such a record in a memory of the terminal device or in a detachable external memory, until it is deleted.

Incidentally, as a service for mobile telephones or television telephones, there is an "incoming message" service for displaying a character string including pictograph on the terminal device that is being called up, in advance of the start of conversation. According to an aspect of the present invention, the identity code "A" may be notified by utilizing the above service.

That is to say, when it is assumed that the subscriber identity code "A" being available on the terminal device is notified by using the "incoming message" service, not only the subscriber identity code "A" but also the purpose of the notification can be displayed while an incoming call is ringing. Examples are "an available number will be notified" or "an available number for you is A".

In this case, if an incoming call is made to generate with "A" used as the subscriber identity code of a source of the incoming call in a pseudo way, the number "A" is displayed while an incoming call is ringing. In addition, since the history of the incoming call is stored as usual, there is an advantage in that the identity code (Number A) of the terminal device can be recorded in the history of the incoming call without the provision of a save operation separately.

The above-described identity code notified as an original communication content does not disturb the notification by means of sound. In general, in response to the detection of the discrimination on the notification chance discrimination section 230 (310), a transmitter is provided for transmitting the subscriber identity code to the corresponding terminal device by use of an e-mail, Short Message Service (SMS), Multimedia messaging Service (MMS), or the like. Visual confirmation is recommended in an identifiable manner by use of the transmitter of this type.

According to an aspect of the present invention, multiple identity codes (for example, telephone numbers) assigned to a terminal device (for example, mobile telephone) are displayed on the terminal device without the provision of a specific configuration, whereby the multiple identity codes are selectively used according to a subscriber's opinion. According to another aspect of the present invention, a mobile communication system and a subscriber identity code notification apparatus are provided so as to display the identity code in accordance with an arrival of an appropriate chance.

What is claimed is:
1. A mobile communication system comprising:
a terminal device to which a plurality of subscriber identity codes are allowed to be assigned to represent the terminal device;
a subscriber identity code holding device for holding the plurality of subscriber identity codes including a first subscriber identity code corresponding to a first telecommunications carrier providing a primary contract with the terminal device and a second subscriber identity code corresponding to a second telecommunications carrier, the first subscriber identity code and the second subscriber identity code being allowed to be assigned to the terminal device; and
a subscriber identity code notification apparatus for determining whether or not the second subscriber identity code corresponding to the second telecommunications carrier held by the subscriber identity code holding device is available to the terminal device, determining whether or not the terminal device of the second subscriber identity code corresponding to the second telecommunications carrier is to be notified to the terminal device, when the terminal device is detected to be located in a coverage area of the second telecommunications carrier after movement from the first telecommunications carrier, and notifying the terminal device of the second subscriber identity code corresponding to the second telecommunications carrier, when determining that the second subscriber identity code corresponding to the second telecommunications carrier is to be notified;
wherein the second subscriber identity code corresponding to the second telecommunications carrier that has been notified to the terminal device is displayed on the terminal device, whereby the terminal device is enabled to communicate in the coverage area of the second telecommunications carrier by use of the second subscriber identity code corresponding to the second telecommunications carrier that has been notified.

2. The mobile communication system according to claim 1, wherein each of the first subscriber identity code and the second subscriber identity code is at least one of a telephone number and an e-mail address.

3. A subscriber identity code notification apparatus for use in a mobile communication system including a terminal device, the subscriber identity code notification apparatus comprising:
a notification chance determination unit for determining from a plurality of subscriber identity codes allowed to be assigned to the terminal device including a first subscriber identity code corresponding to a first telecommunications carrier providing a primary contract with the terminal device and the second subscriber identity code corresponding to a second telecommunications carrier, whether or not the second subscriber identity code corresponding to the second telecommunications carrier is available to the terminal device, determining whether or not the terminal device of the second subscriber identity code corresponding to the second telecommunications carrier is to be notified to the terminal device, when the terminal device is detected to be located in a coverage area of the second telecommunications carrier after movement from the first telecommunications carrier; and
a subscriber identity code notification unit for notifying the terminal device of the second subscriber identity code corresponding to the second telecommunications carrier, when determining that the second subscriber identity code corresponding to the second telecommunications carrier is to be notified;

wherein the second subscriber identity code corresponding to the second telecommunications carrier that has been notified to the terminal device is displayed on the terminal device, whereby the terminal device is enabled to communicate in the coverage area of the second telecommunications carrier by use of the second subscriber identity code corresponding to the second telecommunications carrier that has been notified.

4. The subscriber identity code notification apparatus according to claim 3, wherein, another determination to notify the terminal device of any one of the first subscriber code and the second subscriber identity code is suppressed until the terminal device is detected to have returned to a coverage area of the first telecommunications carrier.

5. The subscriber identity code notification apparatus according to claim 3, wherein, after the subscriber identity code notification unit notifies the terminal device of the second subscriber identity code in accordance with the determination or confirms that the notification is completed by repeatedly notifying the terminal device of the second subscriber identity code, another determination for notification is suppressed until the terminal device is detected to have returned to a coverage area of the first telecommunications carrier.

6. The subscriber identity code notification apparatus according to claim 3, wherein the subscriber identity code notification unit originates an incoming call to the terminal device with the second subscriber identity code corresponding to the second telecommunications carrier used as a subscriber identity code of a source of the incoming call, in response to the determination of the notification of the second subscriber identity code corresponding to the second telecommunications carrier when the notification chance determination unit performs a location registration of the terminal device.

7. The subscriber identity code notification apparatus according to claim 3, wherein the subscriber identity code notification unit further includes:

a determination formation detecting unit for detecting the determination by the notification chance determination unit; and a transmitter that transmits said at least one of the plurality of subscriber identity codes to the terminal device by means of any one of an e-mail, a Short Message Service, and Multimedia Messaging Service, in response to the determination at the determination formation detecting unit.

8. The subscriber identity code notification apparatus according to claim 3, wherein each of the first subscriber identity code and the second subscriber identity code is at least one of a telephone number and an e-mail address.

9. A mobile communication system comprising:

a terminal device to which a plurality of subscriber identity codes are allowed to be assigned to represent the terminal device;

a subscriber identity code holding device for holding the plurality of subscriber identity codes including a first subscriber identity code corresponding to a first telecommunications carrier providing a primary contract with the terminal device and a second subscriber identity code corresponding to a second telecommunications carrier, the first subscriber identity code and the second subscriber identity code being allowed to be assigned to the terminal device; and a subscriber identity code notification unit for determining whether or not the second subscriber identity code corresponding to the second telecommunications carrier held by the subscriber identity code holding device is available to the terminal device, determining whether or not the terminal device of the second subscriber identity code corresponding to the second telecommunications carrier is to be notified to the terminal device, when the terminal device is detected to be located in a coverage area of the second telecommunications carrier after movement from the first telecommunications carrier, and notifying the terminal device of the second subscriber identity code corresponding to the second telecommunications carrier, when determining that the second subscriber identity code corresponding to the second telecommunications carrier is to be notified;

wherein the second subscriber identity code corresponding to the second telecommunications carrier that has been notified to the terminal device is displayed on the terminal device, whereby the terminal device is enabled to communicate in the coverage area of the second telecommunications carrier by use of the second subscriber identity code corresponding to the second telecommunications carrier that has been notified; and wherein, after the subscriber identity code notification unit notifies the terminal device of the second subscriber identity code in accordance with a determination of a notification chance determination unit, another determination to notify the terminal device of any one of the first subscriber code and the second subscriber identity code is suppressed until the terminal device is detected to have returned to a coverage area of the first telecommunications carrier.

10. A subscriber identity code notification apparatus for use in a mobile communication system including a terminal device, the subscriber identity code notification apparatus comprising:

a notification chance determination unit for determining from a plurality of subscriber identity codes allowed to be assigned to the terminal device including a first subscriber identity code corresponding to a first telecommunications carrier providing a primary contract with the terminal device and the second subscriber identity code corresponding to a second telecommunications carrier, whether or not the second subscriber identity code corresponding to the second telecommunications carrier is available to the terminal device, determining whether or not the terminal device of the second subscriber identity code corresponding to the second telecommunications carrier is to be notified to the terminal device, when the terminal device is detected to be located in a coverage area of the second telecommunications carrier after movement from the first telecommunications carrier; and a subscriber identity code notification unit for notifying the terminal device of the second subscriber identity code corresponding to the second telecommunications carrier, when determining that the second subscriber identity code corresponding to the second telecommunications carrier is to be notified;

wherein the second subscriber identity code corresponding to the second telecommunications carrier that has been notified to the terminal device is displayed on the terminal device, whereby the terminal device is enabled to communicate in the coverage area of the second telecommunications carrier by use of the second subscriber identity code corresponding to the second telecommunications carrier that has been notified; and wherein, after the subscriber identity code notification unit notifies the terminal device of the second subscriber identity code in accordance with the determination of the notification chance determination unit, another determination to notify the terminal device of any one of the first subscriber code and the second subscriber identity code is suppressed until the terminal device is detected to have returned to a coverage area of the first telecommunications carrier.

* * * * *